United States Patent [19]

Bludssus et al.

[11] Patent Number: 5,194,232

[45] Date of Patent: Mar. 16, 1993

[54] PROCESS FOR THE PREPARATION OF TANTALUM/NIOBIUM HYDROXIDES AND OXIDES WITH A LOW FLUORIDE CONTENT

[75] Inventors: Walter Bludssus, Vienenburg; Erk-Rüdiger Feuerhahn, Osterode; Horst Zimmermann, Bad Harzburg, all of Fed. Rep. of Germany

[73] Assignee: Hermann C. Starck Berlin GmbH & Co. KG, Berlin, Fed. Rep. of Germany

[21] Appl. No.: 750,519

[22] Filed: Aug. 27, 1991

[30] Foreign Application Priority Data

Sep. 28, 1990 [DE] Fed. Rep. of Germany ....... 4030707

[51] Int. Cl.$^5$ .................... C01G 33/00; C01G 35/00
[52] U.S. Cl. ........................ 423/65; 423/62; 423/63; 423/66; 423/67
[58] Field of Search ............ 423/62, 63, 65, 66, 423/67, 68, DIG. 14, 21.1

[56] References Cited

U.S. PATENT DOCUMENTS

| | | | |
|---|---|---|---|
| 3,112,991 | 12/1963 | Fisher | 423/67 |
| 4,537,750 | 8/1985 | Ritsko et al. | 423/65 |
| 4,942,024 | 6/1990 | Sasaki et al. | 423/65 |

FOREIGN PATENT DOCUMENTS 1-115820  5/1989  Japan.
1-313333  12/1989  Japan.

OTHER PUBLICATIONS

Grant & Hackhs Chemical Dictionary, fifth edition p. 235 (1987).

Primary Examiner—Theodore Morris
Assistant Examiner—Edward Squillante
Attorney, Agent, or Firm—Jerry Cohen; Harvey Kaye

[57] ABSTRACT

Fluorine content of tantalum and niobium hydroxides is reduced to under 0.5 weight % by washing such hydroxide precipitates (as obtained by HF digestion and solvent extraction) with dilute ammonia (1 to 10%) and then water in two washing stages. The first washing stage includes a partial neutralization and the used wash water of the second stage is advantageously recycled, after adjustment of its ammonia concentration, for use as the first stage washing liquid.

10 Claims, No Drawings

| # PROCESS FOR THE PREPARATION OF TANTALUM/NIOBIUM HYDROXIDES AND OXIDES WITH A LOW FLUORIDE CONTENT

FIELD OF THE INVENTION

This invention relates to a process for the preparation of tantalum and niobium hydroxides with a low fluoride content by precipitation from hydrogen fluoride-containing tantalum and/or niobium solutions with ammonia solution.

BACKGROUND OF THE INVENTION

Minerals or concentrates containing tantalum and niobium are conventionally decomposed with HF or mixtures of $HF/H_2SO_4$. The tantalum/niobium heptafluoro complexes formed may be purified by solvent extraction and separated (G. L. Miller, "Tantalum and Niobium", [Butterworths] London 1959).

The heptafluoro complexes obtained from solvent extraction are stripped into the aqueous phase and precipitated from this phase with ammonia. The tantalum/niobium hydroxides are then obtained by filtration and washing of the filter cake with dilute ammonia solutions. This process is described in U.S. Pat. No. 3,112,991 and in German Application 3,428,788.

When the fluoride ions cannot be thoroughly washed out of the filter cake, considerable problems of corrosion occur in the apparatus during the subsequent calcination to convert the products into low fluoride oxides. Under these conditions, exhaust gas purification of the roasting gases also becomes difficult.

Another disadvantage of this process is that it requires the use of a very large amount of ammonia per kg of oxide, which must finally be discharged unused into the effluent, which in turn must then be subjected to an extensive after-treatment to recover the ammonia.

It is therefore an object of the present invention to develop a process which would a) enable the fluoride content to be reduced to a value below 0.5% by weight, preferably under 0.3%, and b) would reduce the ammonia consumption and hence would reduce the amount of ammonia/ammonium salt solutions to be disposed of.

SUMMARY OF THE INVENTION

It has now been found that this problem may be solved by washing the filter residue in at least two stages in which it is first washed with a dilute ammonia solution and then with pure water.

This invention therefore relates to a process for the preparation of tantalum and/or niobium hydroxides with a low fluoride content by precipitation from hydrofluoric-acid-containing tantalum and/or niobium solutions using an ammonia solution, characterised in that the acid solutions are introduced with stirring into an ammonia solution obtained from the first washing step of the preceding filtration process, aqueous $NH_3$ solutions are added until a pH value of at least 9 is obtained and the resulting hydroxide precipitate is filtered off and washed in a first stage with a 1-10% ammonia solution and in a second stage with pure water.

The fluorine content obtained in the resulting hydroxide is inversely proportional to the quantity of ammonia used in the washing solution, i.e. the more ammonia solution is used for washing, the lower will be the fluorine content of the hydroxide.

DETAILED DESCRIPTION OF PREFERRED EMBODIMENTS

In a preferred embodiment of the process according to the invention, which results in substantially complete elimination of fluoride and a saving in ammonia, a washing cycle is carried out in which the wash water from the second washing stage is adjusted to an $NH_3$ content of 1-10% by weight with concentrated ammonia solution and used for the first washing stage carried out on the next batch of hydroxides.

An approximately 3 to 4% suspension of tantalum or niobium hydroxide is thus filtered and washed with a 3% ammonia solution (first washing). This wash solution is introduced into the emptied neutralisation container and used again for the next precipitation (neutralisation). The free ammonia present produces partial neutralisation and reduces the quantity of ammonia required for complete precipitation.

In a second washing process, the filter cake is treated with pure water. The used washing solution is introduced into the emptied container for the first washing, and 25% ammoniacal water is added thereto in such a quantity that a 3% solution is obtained, which may then be used for the first washing of the next cycle. Hydroxides prepared by this process contain less than 0.5% of fluorine. They may be converted into oxides having a low fluoride content by heat treatment at temperatures above 800° C.

The advantage of the process lies in the fact that it uses less ammonia and water than conventional processes for obtaining lower fluoride levels in the end product.

The invention is illustrated below by means of examples, which are not to be regarded as limiting,

EXAMPLE 1

2.5 liters of a solution containing niobium fluoride (concentration of about 120 g $Nb_2O_5$/l) were added to about 5 liters of a 3% ammonia solution. A 25% ammonia solution was added with stirring until a suspension with a pH of about 9 was obtained. The suspension was then filtered and washed with 6 liters of a 3% ammonia solution. This was followed by a second washing with 5 liters of pure water. The filter cake still contained 0.44% of fluorine after drying.

EXAMPLE 2

2.5 liters of niobium fluoride solution (charge about 124 g $Nb_2O_5$/l) were added to about 7 liters of a 3% ammonia solution. A 25% ammonia solution was then added with stirring until a pH of 9 was obtained. After filtration of the suspension, the filter cake was washed with 7 liters of a 3% ammonia solution. This was followed by a second washing with 6 liters of pure water. The fluorine content in the dried hydroxide was found by analysis to be 0.31%.

EXAMPLE 3

2.5 liters of niobium fluoride solution (charge about 120 g $Nb_2O_5$/l) were added with stirring to about 7 liters of the first washing solution obtained from Experiment 2. A 25% ammonia solution was then added until a pH of 9 was obtained. Washing was then carried out as in Example 2. The used solution obtained from the second washing in Example 2 (about 6 liters) was adjusted to 3% with 25% ammoniacal water. The second washing was then carried out with 6 liters of pure water.

The fluoride content in the dried filter cake was 0.22%.

EXAMPLE 4

1.5 liters of a solution containing tantalum fluoride were added to about 7 liters of a 3% ammonia solution (charge about 200 g $Ta_2O_5$/l). The precipitated hydroxide was filtered and washed with 7 liters of a 3% ammonia solution. This was followed by a second washing with 6 liters of pure water. The dried filter cake contained 0.20% of fluorine.

EXAMPLE 5

2 liters of a tantalum fluoride solution (charge 200 g $Ta_2O_5$/l) were added to about 7 liters of a 3% ammonia solution. A 25% ammonia solution was added until a pH of 8.5 was obtained. The suspension was filtered and washed with 7 liters of a 3% ammonia solution. This was followed by a second washing with 6 liters of pure water. The fluorine content in the hydroxide was 0.28%.

EXAMPLE 6

2 liters of tantalum fluoride solution (charge about 200 g $Ta_2O_5$/l) were added to about 7 liters of the first washing solution obtained from Example 5. 25% ammoniacal water was added for adjusting the pH to 8.5. Washing was carried out as in Example 5. The used solution obtained from Example 5 (second washing, about 6 l) was adjusted to 3% with 25% ammoniacal water. The second washing was carried out with pure water. The fluorine content in the dried filter cake was found to be 0.25%.

We claim:

1. Process for extraction of metal hydroxide, where the metal is selected from the class consisting of tantalum and niobium, from an aqueous, acidic fluoro-solution of such metal in a neutralization-precipitation process utilizing a two component system consisting essentially of said fluoro-solution and aqueous ammonia solution and comprising the steps of:
   (a) mixing such fluoro-solution with a first ammoniacal solution to obtain a first mixture,
   (b) mixing the first mixture with a second ammoniacal solution of higher ammonia concentration than said first ammoniacal solution and stirring to form a second mixture until a pH effective to induce precipitation is obtained in the second mixture,
   (c) filtering the second mixture to obtain a filter residue comprising metal hydroxide,
   (d) washing the filter residue with a first washing solution which has a 1-10% ammoniacal content in a first washing stage,
   (e) further washing the filter residue with pure water in a second washing stage and drying the filter residue, wherein a dried filter cake comprising the metal hydroxide of less than 0.5% fluoride content is obtained, and further comprising:
   (f) conducting the steps (a)-(e), above, repeatedly to process successive batches of starting fluoro-solution,
      (f1) with feeding of wash fluid from the said first washing stage in a first batch processing into the said first mixing step of a second later batch processing, and
      (f2) with feeding of wash fluid from the said second washing stage in a first batch processing into the said first washing stage in a second later batch processing.

2. A process in accordance with claim 1 wherein the feeding of wash fluid from the second washing stage of a first batch process is adjusted, by addition of ammoniacal solution thereto, to an ammonia concentration of 1-10%.

3. Process in accordance with claim 1 comprising the further step of heating the hydroxide obtained through steps (a)-(f) by heating at a temperature of a least 800 deg. C. to convert said metal hydroxide to oxide of said metal.

4. A process in accordance with claim 2 wherein the ammonia concentration of the second washing solution is adjusted to 3% for feed to the first washing solution.

5. Process in accordance with claim 4 wherein 25% ammoniacal solution is added to the second wash stage fluid to effect its adjustment to 3% ammoniacal concentration.

6. Process for extraction of metal hydroxide, where the metal is selected from the class consisting of tantalum and niobium, from an aqueous, acidic fluoro-solution of such metal in a neutralization-precipitation process, utilizing a two component system consisting essentially of said fluoro-solution and aqueous ammonia solution and comprising the steps of:
   (a) mixing such fluoro-solution with a first ammoniacal solution to obtain a first mixture,
   (b) mixing the first mixture with a second ammoniacal solution of higher ammonia concentration than said first ammoniacal solution and stirring to form a second mixture until a pH effective to induce precipitation is obtained in the second mixture,
   (c) filtering the second mixture to obtain a filter residue comprising metal hydroxide,
   (d) washing the filter residue with a first washing solution which has a 1-10% ammoniacal content in a first washing stage,
   (e) further washing the filter residue with pure water in a second washing stage and drying the filter residue, wherein a dried filter cake comprising the metal hydroxide of less than 0.5% fluoride content is obtained, and further comprising:
   (f) conducting the steps (a)-(e), above, repeatedly to process successive batches of starting fluoro-solution with feeding of wash fluid from the said first washing stage in a first batch processing into the first said mixing step of a second later batch processing.

7. Process for extraction of metal hydroxide, where the metal is selected from the class consisting of tantalum and niobium, from an aqueous, acidic fluoro-solution of such metal, utilizing a two component neutralization-precipitation system consisting essentially of said fluoro-solution and aqueous ammonia solution and comprising the steps of:
   (a) mixing such fluoro-solution with a first ammoniacal solution to obtain a first mixture,
   (b) mixing the first mixture with a second ammoniacal solution of higher ammonia concentration than said first ammoniacal solution and stirring to form a second mixture until a pH effective to induce precipitation is obtained in the second mixture,
   (c) filtering the second mixture to obtain a filter residue comprising metal hydroxide, (d) washing the filter residue with a first washing solution which has a 1-10% ammoniacal content in a first washing stage, (e) further washing the filter residue with pure water in a second washing stage and drying the filter residue, wherein a dried filter cake comprising the metal hydroxide, of less than 0.5% fluoride content, is obtained.

8. A process in accordance with claim 7 wherein the metal is niobium and the pH is adjusted to 9 in step (b).

9. A process in accordance with claim 7 wherein the metal is tantalum and the pH is adjusted to 8.5 step (b).

10. A process in accordance with claim 7 wherein the metal is processed by the further step of heating the hydroxide obtained through steps (a)-(e) by heating at a temperature of at least 800° deg. C. to convert said metal hydroxide to oxide of said metal.

* * * * *